United States Patent [19]

Woodford, Sr.

[11] 4,182,356
[45] Jan. 8, 1980

[54] SILL COCK ASSEMBLY

[75] Inventor: Joseph C. Woodford, Sr., Spring Lake, Mich.

[73] Assignee: Woodford Manufacturing Company, Des Moines, Iowa

[21] Appl. No.: 896,804

[22] Filed: Apr. 17, 1978

[51] Int. Cl.² ............... F03B 7/10; F16K 17/168
[52] U.S. Cl. ........................... 137/59; 137/360; 137/599.2; 137/859; 138/28; 285/187
[58] Field of Search .............. 137/59, 60, 62, 301, 137/360, 599.2, 614.17, 859; 73/277; 138/27, 28, 26; 285/187

[56] References Cited

U.S. PATENT DOCUMENTS

| 2,652,224 | 9/1953 | Noland | 137/360 |
| 3,913,602 | 10/1975 | Yoon | 137/297 |

FOREIGN PATENT DOCUMENTS

| 124087 | 5/1947 | Australia | 285/187 |
| 2421176 | 11/1975 | Fed. Rep. of Germany | 137/599.2 |

Primary Examiner—Martin P. Schwadron
Assistant Examiner—Richard Gerard
Attorney, Agent, or Firm—Zarley, McKee, Thomte, Voorhees & Sease

[57] ABSTRACT

A sill cock assembly is disclosed comprising a fluid outlet for location on the exterior of a wall, a fluid flow inlet adapted for location adjacent the interior of the wall, a conduit connecting the fluid inlet and the fluid outlet, a selectively operable valve located adjacent the fluid flow inlet for alternatively opening and closing the fluid flow inlet, and a pressure release means located adjacent the valve to allow fluid communication in an inwardly direction from the conduit through the valve to the fluid inlet when the fluid pressure within the conduit due to freezing is greater than the fluid pressure of the inlet. A portion of the wall of the conduit is corrugated adjacent the valve to allow expansion of the conduit during freezing.

8 Claims, 6 Drawing Figures

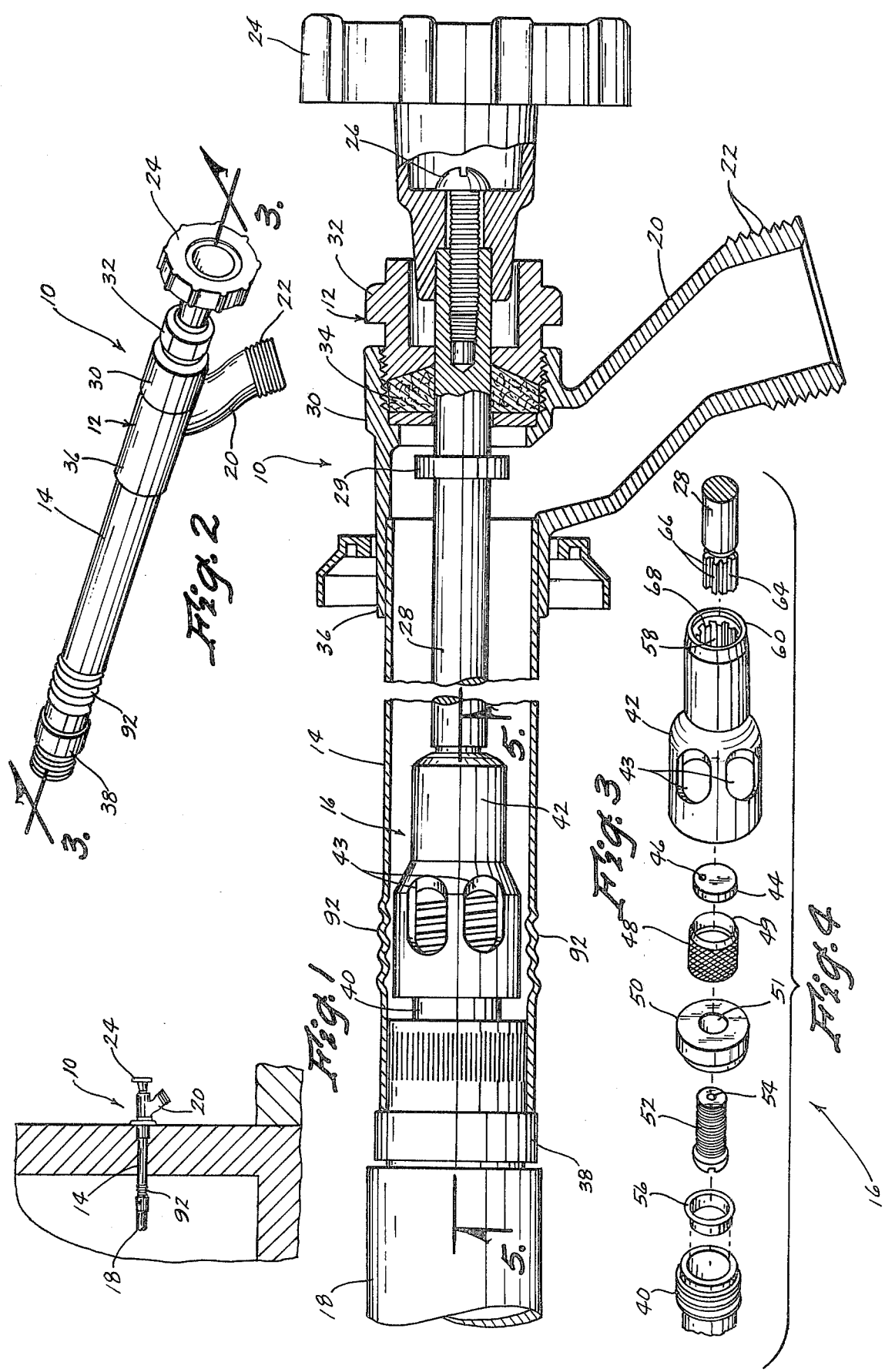

SILL COCK ASSEMBLY

BACKGROUND OF THE INVENTION

This invention relates to sill cock assemblies and more particularly to a sill cock assembly impervious to the detrimental effects of freezing conditions and intended to extend through an enclosure wall from a fluid inlet connection located on the interior of the wall to an outlet connection located exterior of the wall with the sill cock assembly having pressure relief means to allow fluid communication inwardly through the valve in the event of freezing and having a corrugated wall to provide expansion during freezing.

Prior sill cock assemblies would burst or crack due to freezing if a hose or other apparatus was left attached to the nozzle in cold weather thereby preventing draining of the water. Freezing would normally occur initially in the outlet nozzle and progress through the nozzle, and through the conduit and valve of the assembly. As the water progressively freezes inwardly through the sill cock assembly, the remaining water trapped in the assembly is pressurized due to the expansion during freezing and puts great pressure on the interior end of the assembly causing bursting or cracking.

SUMMARY OF THE INVENTION

A sill cock assembly is disclosed comprising a fluid flow outlet for location on the exterior of a wall, a fluid flow inlet for location adjacent the interior of the wall, a conduit connecting the fluid flow inlet and the fluid outlet, a valve within the conduit for alternatively opening and closing the fluid inlet, and a pressure release means adjacent the valve to provide fluid communication from the conduit through the valve to the inlet in an inwardly direction when the pressure of the fluid within the conduit exceeds the line pressure because of freezing. The pressure release means allows fluid flow in an inwardly direction only and this fluid flow is accomplished for a pressure below the bursting strength of the conduit. The wall of the conduit adjacent the valve is corrugated to allow for expansion in the event of substantial freezing.

It is a principal object of this invention to provide an improved sill cock assembly.

A further object of the invention is to provide a sill cock assembly that eliminated damage due to freezing.

A still further object of the invention is to provide a sill cock assembly wherein a pressure relief valve allows fluid to flow inwardly through the valve in response to an increase in fluid pressure within the assembly due to freezing.

A still further object of the invention is to provide a sill cock assembly wherein the wall of the conduit adjacent the valve is corrugated for expansion during freezing.

A still further object of the invention is to provide a sill cock assembly that is economical to manufacture, durable in use, and refined in appearance.

BRIEF DESCRIPTION OF THE DRAWINGS

FIG. 1 is a partial sectional side view of the device installed through a wall.

FIG. 2 is a perspective view of the invention.

FIG. 3 is an enlarged partial sectional view seen on line 3—3 of FIG. 2.

FIG. 4 is an enlarged exploded view of the valve and pressure relief elements.

DESCRIPTION OF THE PREFERRED EMBODIMENT

Figure 5:
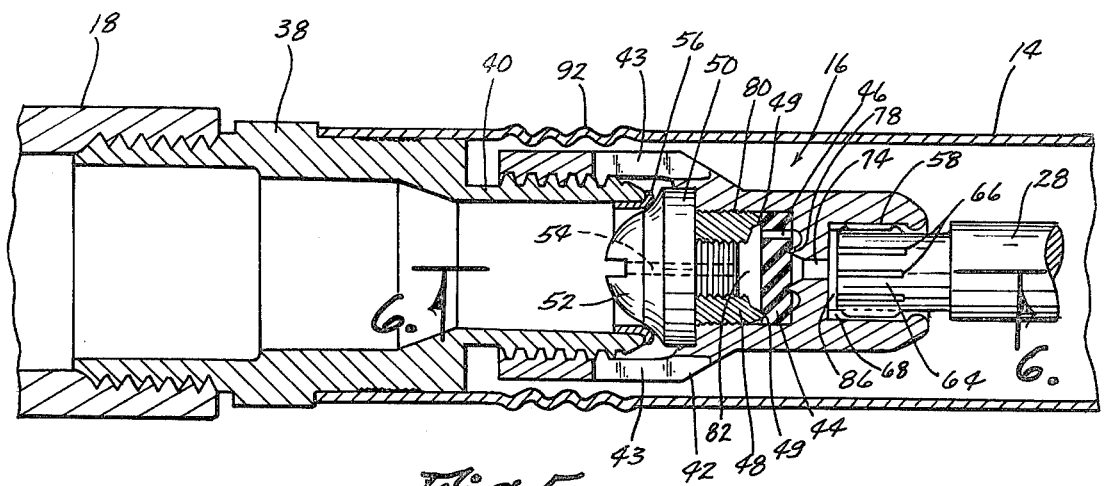
FIG. 5 is a sectional view seen on line 5—5 of FIG. 3.

The numeral 10 generally refers to the sill cock assembly of this device shown in FIG. 2.

Sill cock assembly 10 comprises exterior outlet assembly 12, conduit 14, and valving assembly 16. Conduit 14 contains valving assembly 16 and fluidly connects exterior outlet assembly 12 to water service conduit 18.

Exterior outlet assembly 12 comprises discharge outlet 20 having threads 22 at the end thereof for connection to a hose, wheel handle 24 attached by screw 26 to operating rod 28, housing 30 rotationally receiving operating rod 28, bushing 32 threadably received by housing 30 with packing 34 therebetween, and tube 36 for receiving conduit 14 for attachment thereto by soldering or the like.

Conduit 14 fluidly connects housing 30 to water service conduit 18 via coupling 38 threadably engaging conduit 18 (FIGS. 3 and 5). Threaded extension 40 of coupling 38 extends inwardly through conduit 14 to threadably receive valving sleeve 42 of valving assembly 16. Valving assembly 16 comprises valving sleeve 42, having outlet port 43, pressure relief valve member 44 having aperture 46 therethrough, nut 48, valve member 50, having aperture 51, bolt 52 having aperture 54, and seat 56 (FIG. 4).

Figure 6:
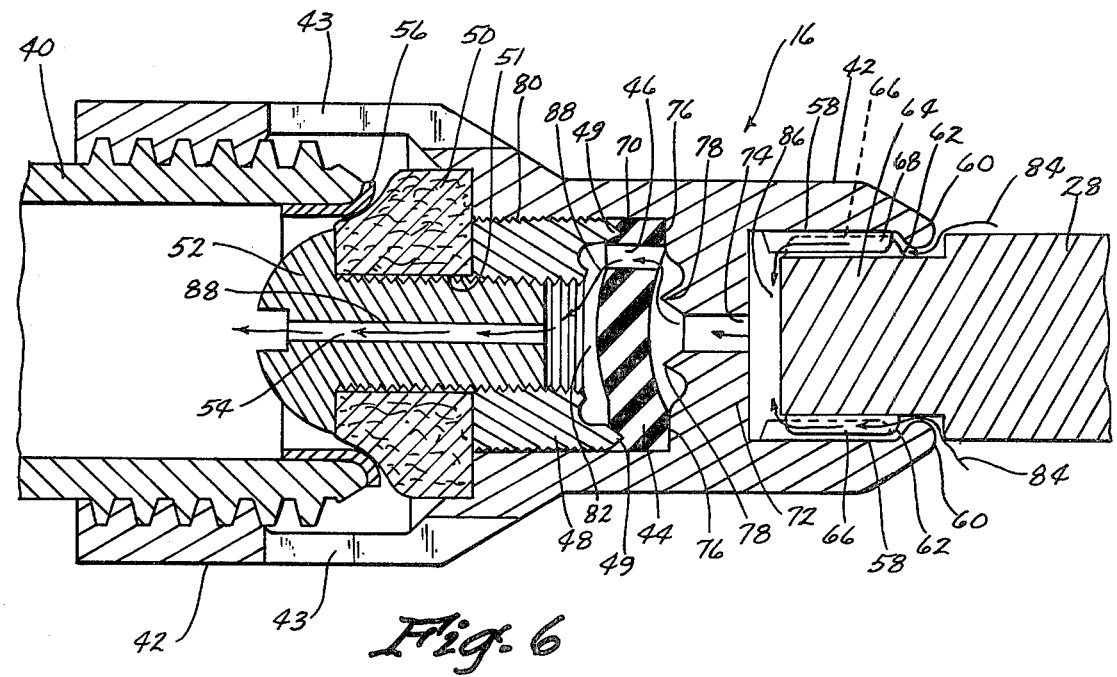
FIG. 6 is an enlarged sectional view seen or line 6—6 of FIG. 5.

Valving sleeve 42 has an outwardly facing bore 58 to slidably receive operating rod 28. The outer rim 60 of sleeve 42 projects inwardly as shown in FIG. 6 and functions as a stop as to projections 62 extending radially from operating rod 28. Thus, a certain amount of axial sliding movement of rod 28 is permitted but limited by the engagement of projection 62 and rim 60. The inner end 64 of rod 28 has longitudinally oriented ridges 66 on the outer surface thereof for reception by grooves 68 of bore 58, thereby allowing rod 28 to impart rotational movement to sleeve 42, yet allow limited axial movement of rod 28 within bore 58.

Inner bore 70 of sleeve 42 is inwardly facing and separated from bore 58 by interior wall 72 (FIG. 6). Inner bore 70 is fluidly connected to bore 58 by passageway 74 extending through interior wall 72. The inwardly disposed face of interior wall 72 has an annular portion 76 and an annular ridge 78 that projects inwardly and slightly beyond the plane of portion 76. Pressure relief member 44 is disposed within inner bore 70 between portion 76 and nut 48. Nut 48 is securely held within bore 70 by nut 48 tightly engaging bore 70. Valve member 50 is securely held against nut 48 by bolt 52 passing through the aperture 51 of valve member 50 and threadably engaging nut 48. Thus, valve member 50 is securely attached to valving sleeve 42 so that upon rotating sleeve 42 via operating rod 28, valve member 50 will move axially into engagement or disengagement with seat 56 secured within threaded extension 40 (FIGS. 5 and 6). Rotational movement of sleeve 42 in one direction causes sleeve 42 and valve member 50 to translate axially in a direction away from extension 40, i.e., outwardly, and rotation in the opposite direction produces axial movement toward extension 40.

When valve member 50 is disengaged from seat 56, fluid will flow from water service conduit 18, through coupling 38, through seat 56, out through outlet ports 43 of valving sleeve 42, through conduit 14 and out discharge outlet 20 of outlet assembly 12. Stop 29 limits the axial movement of valve member 50 and sleeve 42 to maintain the threaded engagement of sleeve 42 to extension 40.

When valve member 50 engages seat 56 so as to shut off the outward flow of fluid from water service conduit 18 under normal non-freezing operating conditions, pressure relief valve member 44 is vertically disposed as shown in FIG. 5. Pressure relief valve member 44 is held in this position by the fluid pressure from conduit 18 passing through aperture 54 of bolt 52 into cavity 82 and against the inwardly disposed surface of valve member 44. This pressure exerts an outwardly directed force against member 44. Since annular ridge 78 protrudes inwardly slightly beyond flat portion 76, passageway 74 is closed off from fluid communication with aperture 46 leading through member 44 to cavity 82 by annular ridge 78. Annular ridge 49 of nut 48 also engages the outer portion of member 44 to maintain the outer portion against flat portion 76.

If a hose is left attached to discharge outlet 20, water will not be able to drain out through outlet 20, and will be trapped within sill cock assembly 10. In freezing temperature conditions, the water remaining within sill cock assembly 10 will freeze beginning at the outermost portion and progressing inwardly toward the interior portion. As the water freezes in the outer portions of the assembly and expands, the water trapped between the closed off extension 40 and the newly formed ice is subjected to an increase in pressure due to the expansion of the ice. As more water freezes, more expansion occurs and the pressure is increased proportionately. It is this increased pressure exerted on the remaining water that causes an ordinary sill cock assembly to crack or burst and not the ice per se. As the trapped water freezes progressively inward, the additional pressure on the remaining water will cause the remaining water to move axially in an inward direction between projection 62 and outer rim 60, as indicated by flow lines 84 and 86. The water will then flow through grooves 68 into bore 58 between interior wall 72 and rod 28. As the pressure increases, the water will be forced through passageway 74 and exert inwardly direction pressure against pressure relief member 44 causing it to bulge inwardly as shown in FIG. 6, thereby providing fluid communication from passageway 74 through aperture 46 to cavity 82 as shown by flow line 88 (FIG. 6). The pressure of the trapped water must be greater than the line pressure of conduit 18 in order to produce this bulging effect on member 44. Since this pressure is greater than the line pressure of conduit 18, the water will flow through aperture 46, through cavity 82, through aperture 54, and into conduit 18 to provide pressure relief to the sill cock assembly. Once the ice has formed inwardly beyond bore 58 thereby trapping water within interior portion 90 of conduit 14, corrugations 92 in the portion of conduit 14 adjacent this trapped water will allow expansion and thereby prevent bursting or cracking. Since a substantial amount of the trapped water has been removed via the pressure relief means, the corrugations 92 provide ample expansion capability to prevent damage from the solidification of the remaining water.

During a total freeze situation, most of the trapped water is forced back into the line supply through pressure relief member 44 and the damaging effect of the remaining water is countered by the conduit corrugations resulting in a sill cock assembly that is impervious to freezing conditions. Thus, it can be seen that this device accomplishes at least all of its stated objectives.

What is claimed is:

1. A sill cock assembly comprising,
   a fluid flow inlet means,
   a fluid outlet means,
   a conduit means fluidly connecting said fluid inlet means and said fluid outlet means, said conduit means having inward and outward ends with said inward end connected to said inlet means and said outward end connected to said outlet means,
   selectively operable valve means operationally connected to said inlet means and adapted to alternately open and close said inlet means and adapted to alternately permit and prevent fluid flow from said inlet means through said conduit means in an outwardly direction, and pressure relief means located adjacent said valve means to provide fluid communication from said conduit means, through said valve means to said inlet means in an inwardly direction at a predetermined fluid pressure when fluid pressure in said conduit means is greater than fluid pressure in said inlet means,
   said pressure relef means comprising a passageway extending through said valve means from said conduit means to said inlet means and closure means operationally connected to said passageway,
   said closure means preventing fluid flow in an outwardly direction through said passageway and allowing fluid flow in an inwardly direction through said passageway at said predetermined fluid pressure within said conduit means,
   said closure means comprising a valve member seat within said passageway, said valve member seat including an annular inner portion and an annular outer portion positioned radially outwardly of said annular inner portion, and a valve member adjacent said valve member seat, said valve member having annular inner and outer portions adapted to engage said annular inner and outer portions respectively of said valve member seat to prevent fluid flow in an outwardly direction through said passageway, said valve member having an aperture therethrough at a position radially intermediate said inner and outer portions of said valve member so that said predetermined fluid pressure within said conduit means disengages said inner portion of said valve member from said inner portion of said valve member seat allowing fluid flow between said disengaged inner portions, through said aperture and said passageway.

2. The device of claim 1 wherein said valve means comprises a perforated sleeve to threadably engage said inlet means, a valve seat attached to said inlet means, a valve head adapted to alternately engage and disengage said valve seat to prevent and permit fluid flow from said inlet means through said perforated sleeve into said conduit means, said valve head located within said sleeve so that rotation of said sleeve translates said valve head axially within said conduit means, and a shaft member attached to said sleeve and extending outwardly through said conduit means adapted for manually imparting rotational movement to said sleeve.

3. The device of claim 1 wherein said conduit means comprises a cylindrical pipe having a corrugated portion to allow expansion of said pipe.

4. The device of claim 3 wherein said corrugated portion is located adjacent said valve means.

5. The device of claim 3 wherein said corrugated portion is adjacent the innermost end of said pipe.

6. The device of claim 1 wherein said inner portion of said valve member seat engages the outwardly facing side of said valve member and said seat projects inwardly slightly beyond said outer portion thereof.

7. The device of claim 6 wherein said annular inner portion of said valve seat member defines an inwardly facing annular ridge.

8. A sill cock assembly comprising,
a fluid flow inlet means,
a fluid outlet means,
a conduit means fluidly connecting said fluid inlet means and said fluid outlet means, said conduit means having inward and outward ends with said inward ends connected to said inlet means and said outward end connected to said outlet means,
selectively operable valve means operationally connected to said inlet means and adapted to alternately open and close said inlet means to alternatively permit and prevent fluid flow from said inlet means through said conduit means in an outwardly direction,
said valve means comprising a preforated sleeve to threadably engage said inlet means, a valve seat attached to said inlet means, a valve head adapted to alternately engage and disengage said valve seat to prevent and permit fluid flow from said inlet means through said perforated sleeve into said conduit means, said valve head located within said sleeve so that rotation of said sleeve translate said valve head axially within said conduit means, and a shaft member attached to said sleeve and extending outwardly through said conduit means adapted for manually imparting rotational movement to said sleeve, and
pressure relief means comprising a passageway extending through said perforated sleeve and valve head from said conduit means to said inlet means and a pressure relief valve member operationally supported in said passageway at a position within said sleeve outwardly of said valve head, said pressure relief valve member preventing fluid flow in an outwardly direction through said passageway and allowing fluid flow in an inwardly direction through said passageway when fluid pressure in said conduit means is greater than fluid pressure in said inlet means.

* * * * *